United States Patent
Gentle et al.

(10) Patent No.: US 7,328,257 B2
(45) Date of Patent: Feb. 5, 2008

(54) SYSTEM FOR AUTOMATICALLY ASSIGNING A TELEPHONE NUMBER TO AN EXISTING TELEPHONE AFTER DETECTING A NETWORK CONNECTION OF A PORTABLE COMPUTER

(75) Inventors: Christopher Reon Gentle, Gladesville (AU); Neil Hepworth, Artarmon (AU); Stéphane Laveau, Paris (FR)

(73) Assignee: Avaya Technology Corp., Basking Ridge, NJ (US)

( * ) Notice: Subject to any disclaimer, the term of this patent is extended or adjusted under 35 U.S.C. 154(b) by 901 days.

(21) Appl. No.: 10/456,004

(22) Filed: Jun. 6, 2003

(65) Prior Publication Data

US 2004/0260795 A1    Dec. 23, 2004

(51) Int. Cl.
*G06F 15/177* (2006.01)
(52) U.S. Cl. .................. 709/221; 709/220; 379/221.13
(58) Field of Classification Search ................ 709/220, 709/221, 222; 370/352, 401, 493, 254; 713/201; 379/201.01, 221.13
See application file for complete search history.

(56) References Cited

U.S. PATENT DOCUMENTS

| 6,275,574 | B1* | 8/2001 | Oran | 379/201.01 |
| 6,603,761 | B1* | 8/2003 | Wang et al. | 370/352 |
| 2002/0114329 | A1 | 8/2002 | Hanson | |
| 2002/0131402 | A1* | 9/2002 | Lee et al. | 370/352 |
| 2002/0133724 | A1* | 9/2002 | Park | 713/201 |
| 2002/0150086 | A1* | 10/2002 | Bailey et al. | 370/352 |
| 2003/0072315 | A1* | 4/2003 | Karino | 370/401 |
| 2003/0072330 | A1* | 4/2003 | Yang et al. | 370/493 |
| 2003/0076819 | A1* | 4/2003 | Emerson | 370/352 |
| 2003/0156579 | A1* | 8/2003 | Cho | 370/352 |
| 2004/0047297 | A1* | 3/2004 | Wynn | 370/254 |

FOREIGN PATENT DOCUMENTS

| EP | 0 484 067 A | 5/1992 |
| EP | 0 117 263 A | 7/1992 |
| WO | WO 98/21911 A | 5/1998 |
| WO | WO 01/65821 A | 9/2001 |

* cited by examiner

*Primary Examiner*—Le Hien Luu
(74) *Attorney, Agent, or Firm*—John C. Moran

(57) ABSTRACT

An apparatus and method that allows a telecommunication identification number for a communication terminal to be determined upon a presence of a user at the network connected telecommunication terminal.

34 Claims, 6 Drawing Sheets

SYSTEM FOR AUTOMATICALLY ASSIGNING A TELEPHONE NUMBER TO AN EXISTING TELEPHONE AFTER DETECTING A NETWORK CONNECTION OF A PORTABLE COMPUTER

TECHNICAL FIELD

The present invention relates to communication systems, and, in particular, to the assignment of telecommunication identification numbers to telecommunication terminals.

BACKGROUND OF THE INVENTION

As corporations have increased the numbers of their employees working mostly off-site, i.e., out of the office, the concept of "hot desks" has become common. Using hot desks, instead of each employee having their own individually assigned desks, employees are assigned an empty desk when they come into their office. Using the assigned desk, the employee can connect their laptop and have use of a desk phone. The problem arises that the desk telephone has a telephone number associated with it that is not assigned to the specific person who is now using the desk. The employee has to transmit this telephone number to people with whom they may need to communicate. It is inconvenient to reconfigure the telecommunication switching equipment to provide a new number for the employee each time they sit at a particular desk since the reconfiguring is a manual operation. Further, the reconfiguration must be manually undone once the employee is no longer using the desk.

Within the prior art, one solution to the above problem is to have specially equipped telephone sets that accept credit cards which define the user to the telephone switching system. The disadvantage of this technique is the need for specially developed telephone sets.

In addition, certain telecommunication switching systems such as MultiVantage® telecommunication switching system from Avaya, Inc. provide features that allow a telephone set to have its telephone number modified by a user through the use of a feature access code, a secret code and extension number. The phone can be tailored to the needs of the user. Unfortunately, this prior art solution does require a number of manual operations on the part of the user. In addition, the user must remember to reset the extension number when the user is done using the desk.

Another prior art solution that has been used by some corporations is to give employees only wireless telephones, which they can then carry to any desk within the office complex. The wireless telephone is always used by the same user; hence, it always has the correct telephone number.

SUMMARY OF THE INVENTION

The above mentioned problems are solved and a technical advance is achieved in the art by an apparatus and method that allows a telecommunication identification number for a communication terminal to be determined upon the presence of a user at the telecommunication terminal.

DETAILED DESCRIPTION

Figure 1:
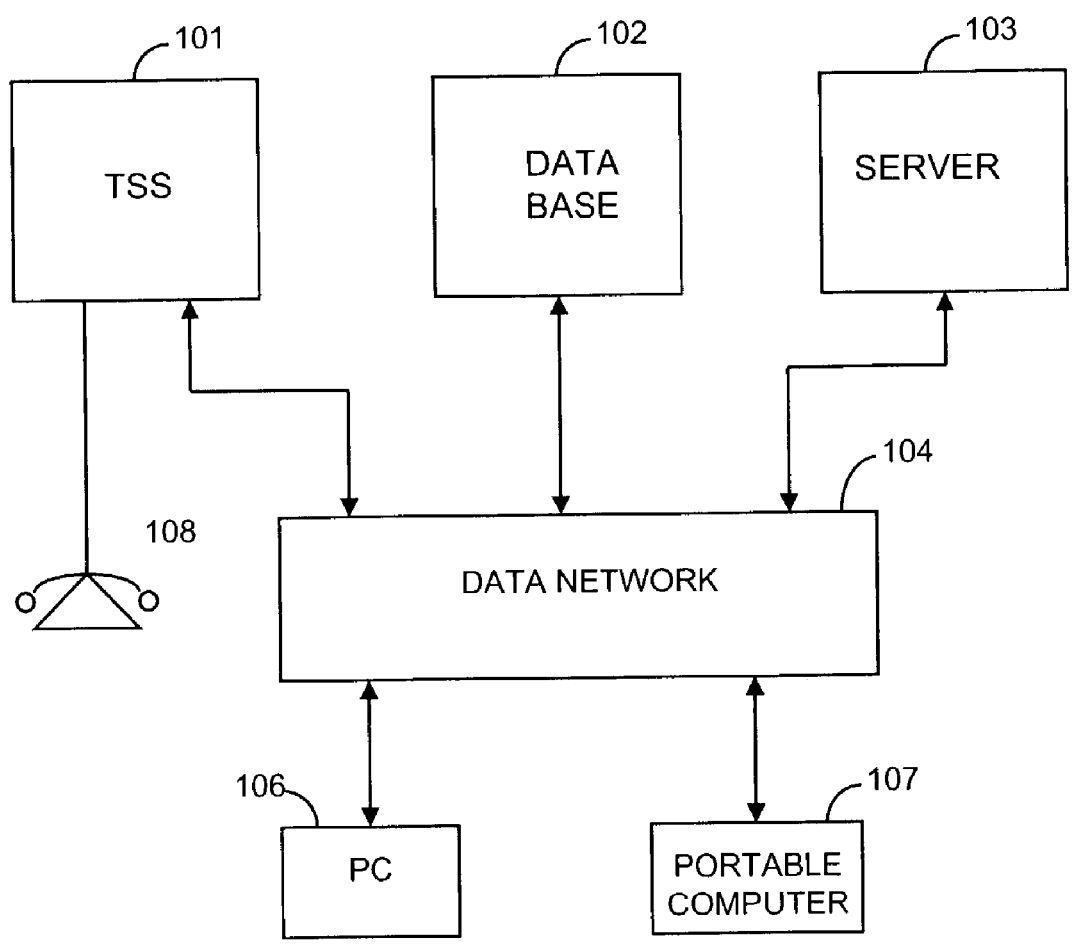
FIG. 1 illustrates, in block diagram form, an embodiment of the invention.

FIG. 1 illustrates, in block diagram form, an embodiment of the invention. In this embodiment, the user of laptop 107 is assigned a hot desk on which is telephone set 108. Telecommunication services are provided to telephone set 108 by telecommunication switching system 101. Server 103 provides data processing support for portable computer 107. Portable computer may be a laptop computer, personal digital assistant (PDA), etc. (The portable computer is also referred to as a user computer.) Data network 104 provides communication for elements 101-103, 106 and 107. Data network 104 may be an Ethernet network or any other data network, as is well known to those skilled in the art.

When portable computer 107 establishes a connection to server 103 via data network 104, server 103 identifies the port used by portable computer 107 by a network port number used by the network. The network port number defines the physical connection to the network. The user will be identified by the portable computer identification information. If data network 104 is the Ethernet, the identification may be the machine address controller (MAC). In addition, the IP address of portable computer 107 may be used for identification. Upon identifying the port based on the MAC or IP address, server 103 will access database 102 via data network 104 to determine which telephone set is associated with the port on the data network to which portable computer 107 is connected. Also, server accesses the database to determine the user of portable computer 107 based on a mapping between portable computer 107 and the user. One skilled in the art could readily envision that database 102, rather than being a stand alone database, could be part of server 103 or telecommunication switching system 101. Server 103 extracts from database 102 the telephone number that is assigned to the user and the port number on telephone switching system 101 for telephone 108. Server 103 then transmits a message via data network 104 to telecommunication switching system 101 requesting that telephone switching system 101 assigned the telephone number of the user to telephone set 108. One skilled in the art can readily envision different mechanisms for transmitting a message from server 103 to telecommunication switching system 101 then via a data network. For example, it is well known in the art to establish a direct connection between a server and a telecommunication switching system.

When the user disconnects portable computer 107 from the network, server 103 transmits a message to telecommunication system 101 requesting that telecommunication system 101 remove the assignment of the user's telephone number to 108.

Consider a second embodiment of the invention where personal computer 106 permanently is co-located with telephone set 108 on a particular desk. When the user is assigned to this desk, the user logs on to server 103 via personal computer 106 using login methods well known to those skilled in the art. Server 103 then identifies personal computer 106 with the user using the login information and identifies telephone set 108. Server 103 then requests that telecommunication switching system 101 assign the user's telephone number to telephone set 108.

Figure 2:
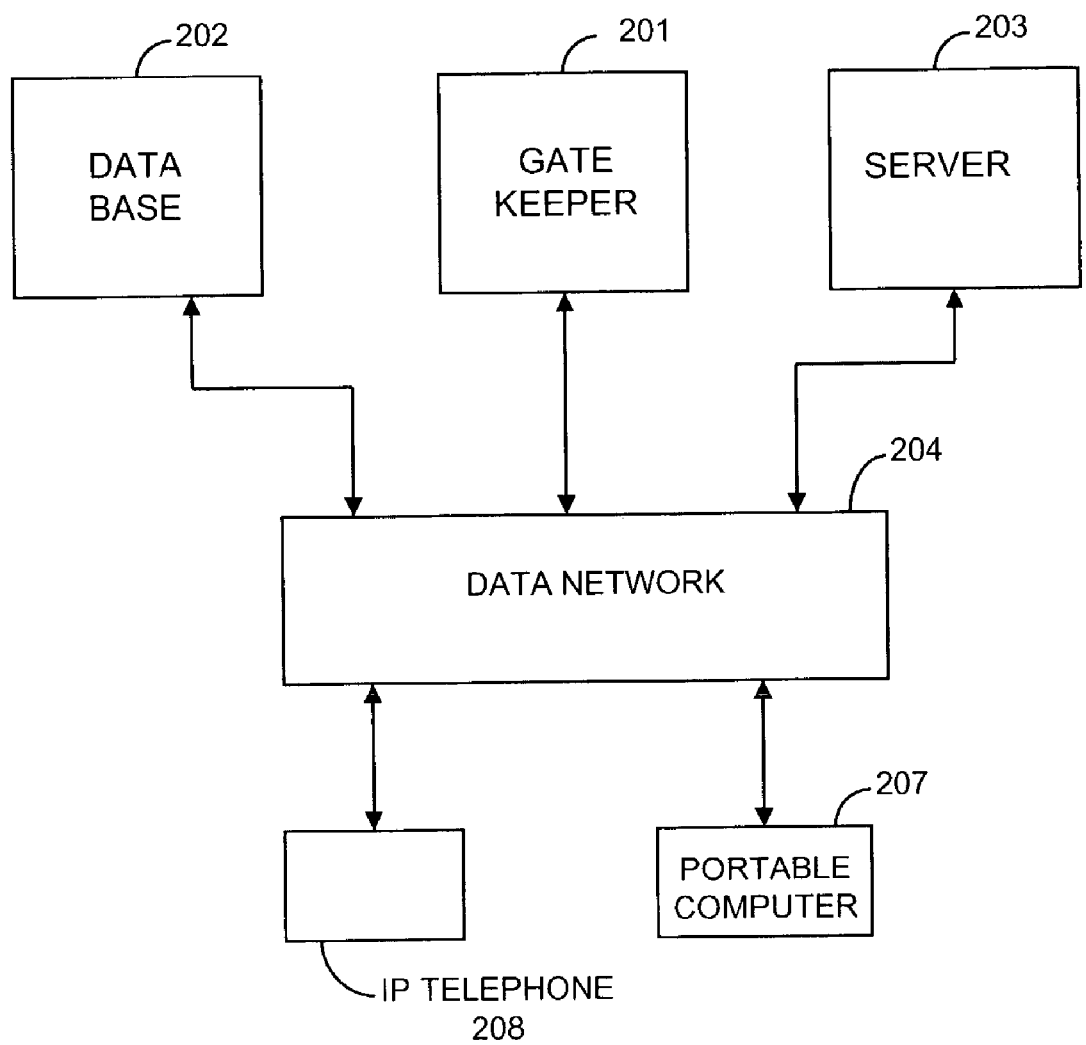
FIG. 2 illustrates, in block diagram form, another embodiment of the invention.

FIG. 2 illustrates another embodiment of the invention. In FIG. 2, gatekeeper 201 is providing telephone service for IP telephones such as IP telephone 208 via data network 204. When the user of portable computer 207 is assigned a desk on which IP telephone 208 is located, server 203 will determine the association of portable computer 207 with IP telephone 208 by monitoring the establishment of connections on data network 204. By performing this monitoring, server 203 can determine not only when portable computer 207 becomes active but also the port on data network 204 that portable computer 207 is utilizing. Once again, when server 203 has determined the port being utilized by portable computer 207, it makes the association that IP telephone 208 is close to this port. Server 203 access database 202 to obtain the telephone number assigned to the user of portable computer 207 as well as other information identifying IP telephone 208 to gatekeeper 201. Server 203 then requests that gatekeeper 201 associate the telephone number of the user with IP telephone 208 by the transmission of one or more messages via data network 204.

When the user disconnects portable computer 207 from the network, server 203 transmits a message to gatekeeper 201 requesting that gatekeeper 201 remove the assignment of the user's telephone number to IP telephone 208.

Figure 3:
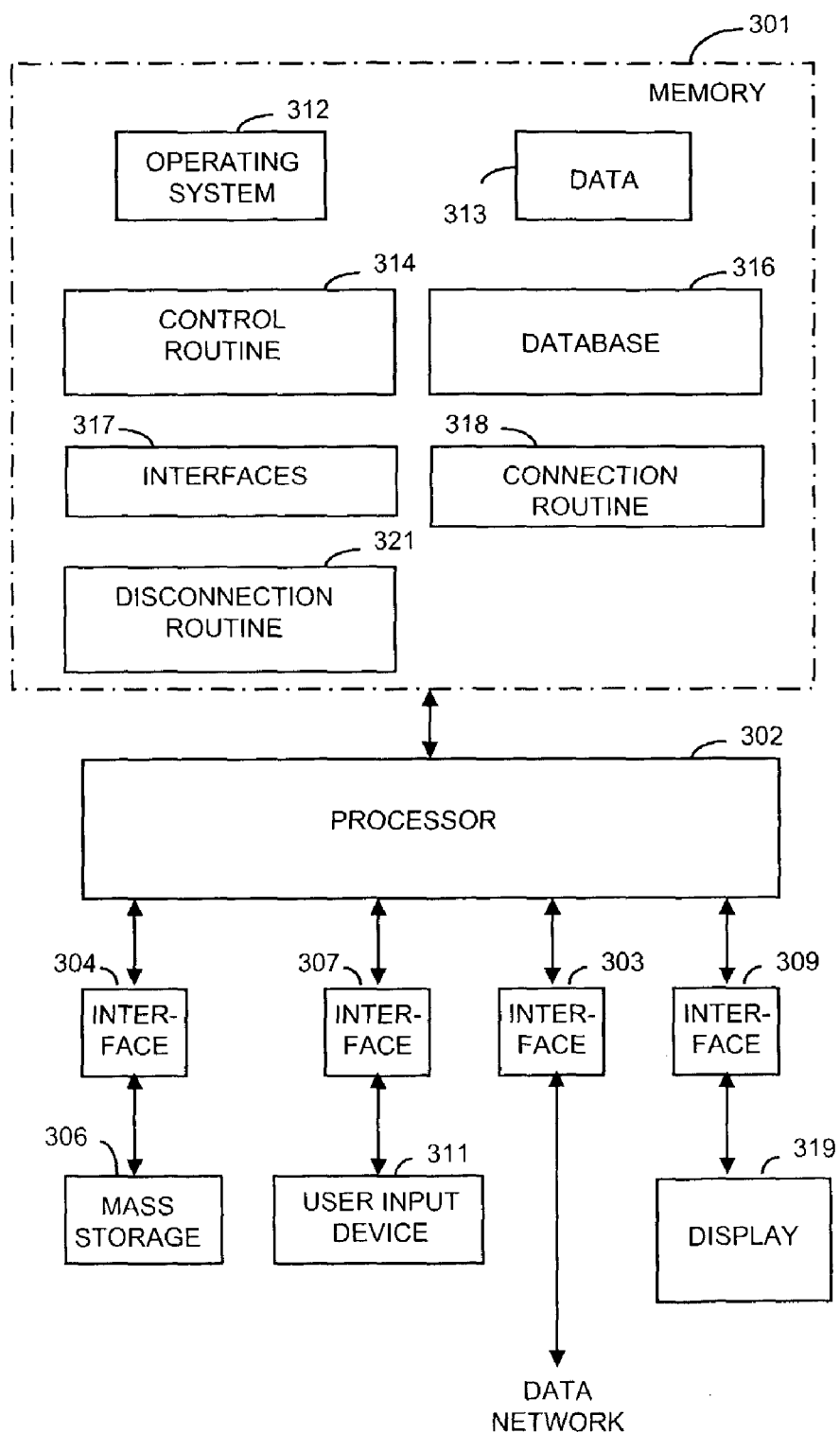
FIG. 3 illustrates, in block diagram form, an embodiment of a server or other computer.

FIG. 3 illustrates, in block diagram form, one embodiment of a computer such as server 103 or 203. Processor 302 provides the overall control for the functions of a computer by executing programs and storing and retrieving data from memory 301. Processor 302 connects to data network 104 or 204 via interface 303. Processor 302 interfaces to user input device 311 via interface 307 and connects to display 319 via interface 309. Processor 302 performs the operations of the embodiments by executing the routines illustrated in memory 301.

Operating system 312 provides the overall control and the necessary protocol operations. Database 316 stores information to be utilized by the various routines. Control is performed by control routine 316. The communication and control of the various interfaces illustrated in FIG. 3 is provided by interfaces routine 317. Connection routine 318 controls the operations concerned with the connection of a user's computer to the data network, and disconnection 321 performs the operations that result when a user's computer is disconnected from the data network.

Figure 4:
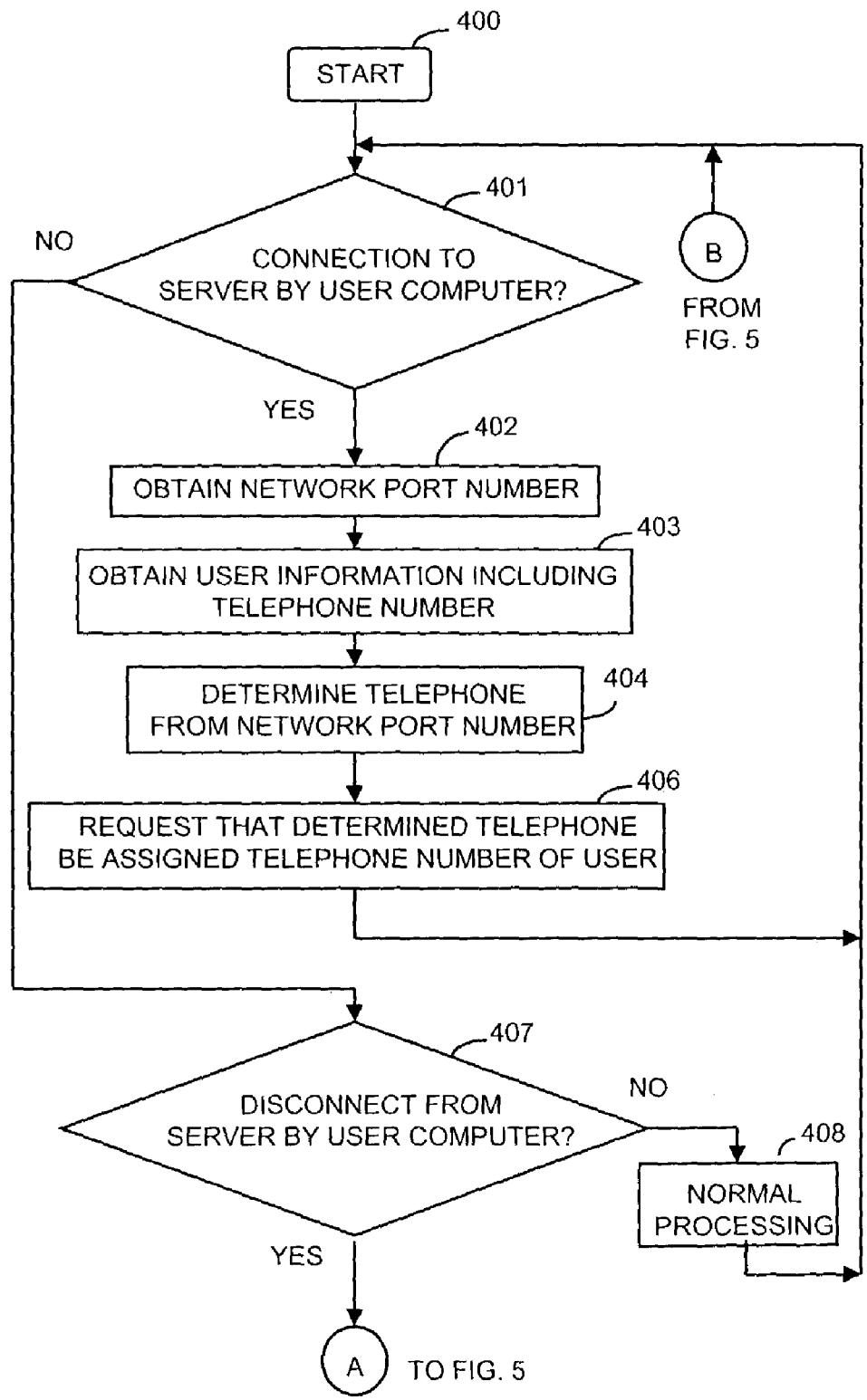
FIGS. 4 and 5 illustrate, in flowchart form, operations performed in implementing embodiments of the invention.
Figure 5:
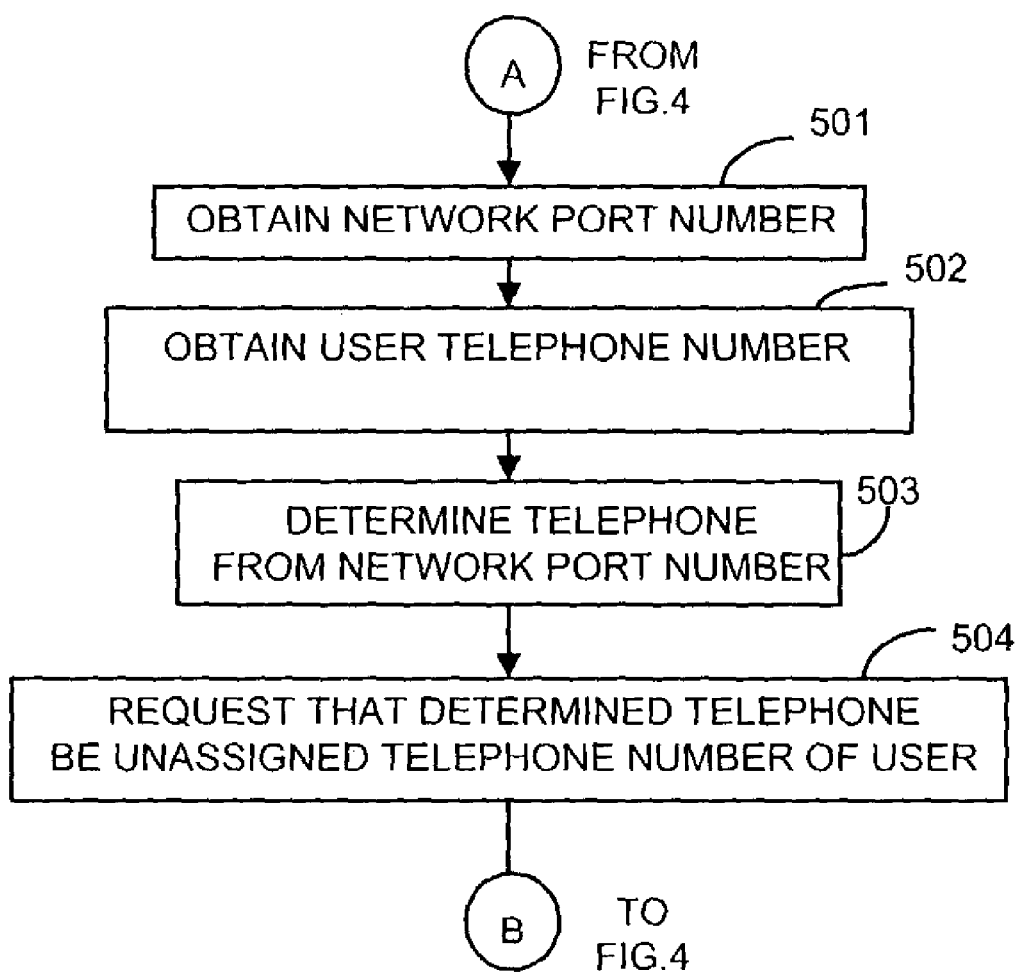

FIGS. 4 and 5 illustrate, in flowchart form, operations of embodiments of the invention. After being started from block 400, decision block 401 determines if a connection is being made to the server by a user's computer. If the answer is yes, block 402 obtains the network port number through which the user's computer is connecting to the data network. Block 403 then utilizes information resulting from when the user logs into the server to obtain the user's information that includes the user's telephone number. Block 404 determines the telephone that is physically located with the port whose network port number is being utilized by the computer by accessing a database. Finally, block 406 requests that a telephone switching system or a gatekeeper that is controlling the telephony operations assign the telephone number of the user to the telephone before transferring control back to decision block 401.

Returning to decision block 401, if the answer is no in decision block 401, decision block 407 determines if a user computer is disconnecting from the server. If the answer is no, block 408 performs normal processing before transferring control back to decision block 401. If the answer is yes in decision block 407, control is transferred to block 501 of FIG. 5, block 501 obtains the network port number from which the computer is disconnecting, and block 502 obtains the user telephone number of the user that is using the computer. Block 503 determines the telephone that is associated with the network port number. In another embodiment, the server retains information in an internal database that records the user's telephone number and the telephone that the user is currently utilizing or, in yet another embodiment, this information can be stored in an external database such as database 102 or 202. Finally, block 504 requests that the determined telephone be unassigned the telephone number of the user before control is transferred back to decision block 401.

Figure 6:
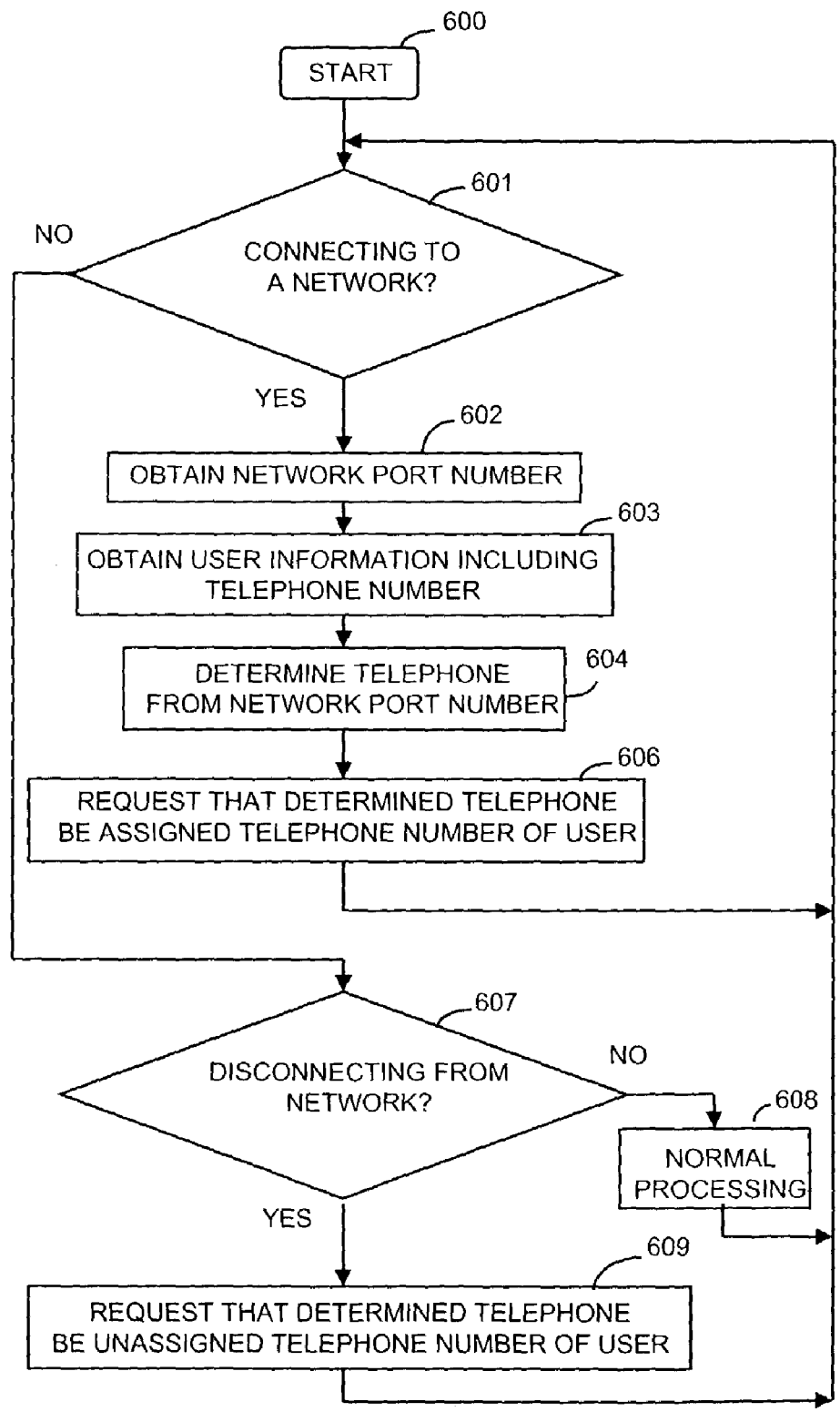
FIG. 6 illustrates, in flowchart form, operations performed by another embodiment of the invention.

FIG. 6 illustrates, in flowchart form, operations of another embodiment of the invention. In this embodiment, the operations are performed by the portable computer of a user. After being started from block 600, decision block 601 determines if the portable computer is connecting to a network such as networks 104 or 204. If the answer is yes, block 602 obtains the network port number through which the user's portable computer is connecting to the data network. Block 603 then utilizes internal information to obtain the user's telephone number. The portable computer may also access the telephone number from an external database. Block 604 determines the telephone that is physically located with the port whose network port number is being utilized by the portable computer by accessing a database. Finally, block 606 requests that a telephone switching system or a gatekeeper that is controlling the telephony operations assign the telephone number of the user to the telephone before transferring control back to decision block 601.

Returning to decision block 601, if the answer is no in decision block 601, decision block 607 determines if the portable computer is disconnecting from the server. This detection may be done by determining that the user is powering down the portable computer or by another indication from the user. If the answer is no, block 608 performs normal processing before transferring control back to decision block 601. If the answer is yes in decision block 607, control is transferred to block 609. The latter block requests that the determined telephone be unassigned the telephone number of the user before control is transferred back to decision block 601.

In another embodiment, a portable computer interconnects via a wireless network for example a Bluetooth wireless network. The location of the portable computer is determined based on a location of a wireless base station or picronet with which the portable computer is in contact.

When the operations of devices 103, 107, 203, or 207 are implemented in software, as is shown in FIGS. 4-6, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. Devices 103, 107, 203, or 207 can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where devices 103, 107, 203, or 207 is implemented in hardware, devices 103, 107, 203, or 207 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modification to the illustrated embodiments described above will be apparent to those skilled in the art. Such changes and modifications can be made without departing from the spirit and scope of the invention and without diminishing its intended advantages. It is therefore intended that such changes and modifications be covered by the following claims except insofar as limited by the prior art.

What is claimed is:

1. A method for assigning telecommunication identification numbers to telecommunication terminals, comprising the steps of:
    detecting a network connection of a portable computer to a server via a network;
    determining a physical connection point of the network connection;
    determining a telecommunication terminal assigned to the physical connection point wherein the telecommunication terminal is a distinct physical unit from the portable computer, is not permanently associated with the portable computer, and is permanently located at the physical connection point;
    accessing a database for a telecommunication identification number assigned to a user of the portable computer; and
    assigning the accessed telecommunication identification number to the determined telecommunication terminal.

2. The method of claim 1 wherein the step of assigning comprises the step of transmitting a message to a telecommunication gatekeeper controlling the telecommunication terminal requesting that the accessed telecommunication identification number be assigned to the determined telecommunication terminal.

3. The method of claim 2 wherein the step of transmitting comprises the step of communicating the message via the network.

4. The method of claim 3 wherein the telecommunication terminal is interconnected to the telecommunication gatekeeper via the network.

5. The method of claim 1 further comprises the step of storing the database on one of the following: the server, the telecommunication gatekeeper, or a database computer.

6. The method of claim 1 further comprises the steps of detecting a disconnection of the portable computer from the network; and
    removing the assignment of the telecommunication identification number to the telecommunication terminal.

7. The method of claim 6 wherein the step of removing comprises the step of transmitting another message to the telecommunication gatekeeper controlling the telecommunication terminal requesting that the accessed telecommunication identification number not be assigned to the determined telecommunication terminal.

8. The method of claim 7 wherein the step of transmitting the other message comprises the step of communicating the other message via the network to the telecommunication gatekeeper.

9. The method of claim 1 wherein the network is an Ethernet and the step of determining the physical connection point comprises the step of identifying the machine address controller number of the physical connection point.

10. The method of claim 1 wherein the step of accessing comprises the step of identifying the portable computer by its IP address.

11. A method for assigning telecommunication identification numbers to telecommunication terminals, comprising the steps of:
    connecting to a network by a portable computer;
    determining the physical connection point of the network connection by the portable computer;
    determining a telecommunication terminal assigned to the physical connection point by the portable computer wherein the telecommunication terminal is a distinct physical unit from the portable computer, is not permanently associated with the portable computer, and is permanently located at the physical connection point;
    accessing a database for a telecommunication identification number assigned to a user of the portable computer by the portable computer; and
    requesting that the telecommunication identification number be assigned to determined telecommunication terminal.

12. The method of claim 11 wherein the step of requesting comprises the step of transmitting a message to a telecommunication gatekeeper controlling the telecommunication terminal to request that the accessed telecommunication identification number be assigned to the determined telecommunication terminal.

13. The method of claim 12 wherein the step of transmitting comprises the step of communicating the message via the network.

14. The method of claim 13 wherein the telecommunication terminal is interconnected to the telecommunication gatekeeper via the network.

15. The method of claim 11 further comprises the step of storing the database on one of the following: the portable computer, the server, the telecommunication gatekeeper, or a database computer.

16. The method of claim 11 further comprises the steps of detecting an event indicating a disconnection of the portable computer from the network; and
    removing the assignment of the telecommunication identification number to the telecommunication terminal.

17. A tangible storage computer-readable medium containing computer-executable instructions stored in computer memory configured for:
  detecting a network connection of a portable computer to a server via a network;
  determining a physical connection point of the network connection;
  determining a telecommunication terminal assigned to the physical connection point wherein the telecommunication terminal is a distinct physical unit from the portable computer, is not permanently associated with the portable computer, and is permanently located at the physical connection point;
  accessing a database for a telecommunication identification number assigned to a user of the portable computer; and
  assigning the accessed telecommunication identification number to the determined telecommunication terminal.

18. The tangible storage computer-readable medium of claim 17 wherein the assigning comprises transmitting a message to a telecommunication gatekeeper controlling the telecommunication terminal requesting that the accessed telecommunication identification number be assigned to the determined telecommunication terminal.

19. The tangible storage computer-readable medium of claim 18 wherein the transmitting comprises communicating the message via the network.

20. The tangible storage computer-readable medium of claim 19 wherein the telecommunication terminal is interconnected to the telecommunication gatekeeper via the network.

21. The tangible storage computer-readable medium of claim 17 further comprises storing the database on one of the following: the server, the telecommunication gatekeeper, or a database computer.

22. The tangible storage computer-readable medium of claim 17 further comprises the steps of detecting a disconnection of the portable computer from the network; and removing the assignment of the telecommunication identification number to the telecommunication terminal.

23. The tangible storage computer-readable medium of claim 22 wherein the removing comprises transmitting another message to the telecommunication gatekeeper controlling the telecommunication terminal requesting that the accessed telecommunication identification number not be assigned to the determined telecommunication terminal.

24. The tangible storage computer-readable medium of claim 23 wherein the transmitting the other message comprises communicating the other message via the network to the telecommunication gatekeeper.

25. The tangible storage computer-readable medium of claim 17 wherein the network is an Ethernet and the determining the physical connection point comprises identifying the machine address controller number of the physical connection point.

26. The tangible storage computer-readable medium of claim 17 wherein the accessing comprises identifying the portable computer by its IP address.

27. A tangible storage computer-readable medium containing computer-executable instructions stored in computer memory configured for:
  connecting to a network by a portable computer;
  determining the physical connection point of the network connection by the portable computer;
  determining a telecommunication terminal assigned to the physical connection point by the portable computer wherein the telecommunication terminal is a distinct physical unit from the portable computer, is not permanently associated with the portable computer, and is permanently located at the physical connection point;
  accessing a database for a telecommunication identification number assigned to a user of the portable computer by the portable computer; and
  requesting that the telecommunication identification number be assigned to determined telecommunication terminal.

28. The tangible storage computer-readable medium of claim 27 wherein the requesting comprises transmitting a message to a telecommunication gatekeeper controlling the telecommunication terminal to request that the accessed telecommunication identification number be assigned to the determined telecommunication terminal.

29. The tangible storage computer-readable medium of claim 28 wherein the transmitting comprises communicating the message via the network.

30. The tangible storage computer-readable medium of claim 29 wherein the telecommunication terminal is interconnected to the telecommunication gatekeeper via the network.

31. The tangible storage computer-readable medium of claim 27 further comprises storing the database on one of the following: the portable computer, the server, the telecommunication gatekeeper, or a database computer.

32. The tangible storage computer-readable medium of claim 27 further comprises the steps of detecting an event indicating a disconnection of the portable computer from the network; and removing the assignment of the telecommunication identification number to the telecommunication terminal.

33. An apparatus for determining a telecommunication identification number of a telecommunication terminal, comprising:
  means for identifying a network port to which a portable computer is connected;
  means for accessing stored information to determine a telecommunication terminal associated with the network port wherein the telecommunication terminal is a distinct physical unit from the portable computer, is not permanently associated with the portable computer, and is permanently located at the physical connection point;
  means for determining a telecommunication identification number assigned to a user of the portable computer; and
  means for assigning the telecommunication identification number to the telecommunication terminal.

34. A portable computer for determining a telecommunication identification number of a telecommunication terminal, comprising:
  means for identifying a network port to which the portable computer is connected;
  means for accessing stored information to determine a telecommunication terminal associated with the network port wherein the telecommunication terminal is a distinct physical unit from the portable computer, is not permanently associated with the portable computer, and is permanently located at the physical connection point;
  means for determining a telecommunication identification number assigned to a user of the portable computer; and
  means for assigning the telecommunication identification number to the telecommunication terminal.

* * * * *